US010297991B2

(12) United States Patent
Soerensen (10) Patent No.: US 10,297,991 B2
(45) Date of Patent: May 21, 2019

(54) CABLE ARMOUR STRIPPING UNIT (71) Applicant: Siemens Aktiengesellschaft, München (DE)

(72) Inventor: Johnny Soerensen, Videbæk (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 1 day.

(21) Appl. No.: 15/477,441

(22) Filed: Apr. 3, 2017

(65) Prior Publication Data

US 2017/0346265 A1 Nov. 30, 2017

(30) Foreign Application Priority Data

May 31, 2016 (EP) ..................................... 16172232

(51) Int. Cl.
H02G 1/12 (2006.01)

(52) U.S. Cl.
CPC ........... H02G 1/1265 (2013.01); H02G 1/127 (2013.01); H02G 1/1231 (2013.01); H02G 1/1268 (2013.01); H02G 1/1297 (2013.01)

(58) Field of Classification Search
CPC .. H02G 1/1265; H02G 1/1268; H02G 1/1297; H02G 1/1231; H02G 1/127
See application file for complete search history.

(56) References Cited

U.S. PATENT DOCUMENTS

| | | | | |
|---|---|---|---|---|
| 1,661,180 A | * | 3/1928 | Johnson ............... | H02G 1/1265 81/9.51 |
| 2,031,470 A | * | 2/1936 | Eck ...................... | H02G 1/1297 30/124 |
| 2,319,198 A | * | 5/1943 | Barrans ................ | H02G 1/1268 81/9.51 |
| 2,654,941 A | * | 10/1953 | Schleimer ............ | H02G 1/1297 30/372 |
| 2,671,363 A | * | 3/1954 | Wells ................... | H02G 1/1265 81/9.51 |

(Continued)

FOREIGN PATENT DOCUMENTS

| | | |
|---|---|---|
| CN | 2847615 Y | 12/2006 |
| CN | 204706758 U | 10/2015 |

(Continued)

OTHER PUBLICATIONS

European Search Report dated Aug. 26, 2016; Application No. 16172232.7; 7 pgs.

(Continued)

*Primary Examiner* — Sean M Michalski
(74) *Attorney, Agent, or Firm* — Schmeiser, Olsen & Watts, LLP (57) ABSTRACT

A cable armour stripping unit is provided, including a frame configured to accommodate a transmission cable having a plurality of armoured outer layers arranged about an inner sheath enclosing a plurality of conductors and to hold a cutter arrangement including at least one cutting tool arranged to cut into an armoured outer layer of the cable; a vertical feed arrangement configured to effect a translation of the frame relative to the cable, and a rotation arrangement configured to effect a rotation of the frame relative to the cable. A method of stripping armour from a transmission cable is also provided.

13 Claims, 6 Drawing Sheets

(56) References Cited

U.S. PATENT DOCUMENTS

| | | | | |
|---|---|---|---|---|
| 2,687,560 A * | 8/1954 | St Palley | B23D 45/006 | 30/124 |
| 2,826,871 A * | 3/1958 | Baker | H02G 1/1265 | 451/180 |
| 2,878,550 A * | 3/1959 | Schlueter | B23D 21/08 | 30/101 |
| 3,082,523 A * | 3/1963 | Modes | H02G 1/1231 | 156/247 |
| 3,273,236 A * | 9/1966 | McDowell | H02G 1/1297 | 30/90.2 |
| 3,316,781 A * | 5/1967 | Bignell | H01B 7/36 | 81/9.51 |
| 3,633,275 A * | 1/1972 | Hutchinson | B23D 45/122 | 30/375 |
| 3,736,822 A * | 6/1973 | McVaugh | H01B 13/0003 | 83/155.1 |
| 4,055,097 A * | 10/1977 | Ducret | B23D 45/122 | 144/250.13 |
| 4,062,110 A * | 12/1977 | Alvarez | H02G 1/1297 | 30/370 |
| 4,142,290 A * | 3/1979 | Ducret | H02G 1/1297 | 30/90.3 |
| 4,199,854 A * | 4/1980 | Bitting | H01B 13/0003 | 29/426.5 |
| 4,489,491 A * | 12/1984 | Gregson | H02G 1/1231 | 30/90.7 |
| 4,514,058 A * | 4/1985 | Walton | D07B 1/08 | 174/128.1 |
| 4,534,254 A * | 8/1985 | Budzich | H01B 15/005 | 29/403.3 |
| 4,769,909 A * | 9/1988 | Ducret | H02G 1/1297 | 30/90.3 |
| 4,884,339 A * | 12/1989 | Custin | H02G 1/1297 | 30/90.3 |
| 4,942,795 A * | 7/1990 | Linke | B23D 47/12 | 83/403.1 |
| 4,977,671 A * | 12/1990 | Ducret | H02G 1/1297 | 30/90.2 |
| 4,979,307 A * | 12/1990 | Ste Marie | B23D 45/003 | 30/166.3 |
| 5,238,177 A * | 8/1993 | Nakulski | B23K 13/015 | 219/636 |
| 5,243,882 A * | 9/1993 | Stepan | G02B 6/245 | 81/9.42 |
| 5,463,711 A * | 10/1995 | Chu | G02B 6/4416 | 174/70 R |
| 5,809,652 A | 9/1998 | Ducret | | |
| 6,311,600 B1 * | 11/2001 | Lo | H02G 1/126 | 30/90.9 |
| 6,747,213 B2 * | 6/2004 | Bonicel | H01B 7/22 | 174/102 R |
| 7,891,097 B2 * | 2/2011 | Hartranft | H02G 1/1297 | 30/90.3 |
| 8,522,440 B2 * | 9/2013 | Ducret | H02G 1/005 | 30/90.1 |
| 9,088,144 B2 * | 7/2015 | Ducret | H02G 1/1217 | |
| 9,115,543 B2 * | 8/2015 | Pionetti | E21B 17/012 | |
| 9,270,095 B2 * | 2/2016 | Johnston | H02G 1/1253 | |
| 9,476,521 B2 * | 10/2016 | Pionetti | F16L 1/19 | |
| 2003/0110899 A1 * | 6/2003 | Palmowski | H02G 1/1265 | 81/9.51 |
| 2004/0194582 A1 * | 10/2004 | Palmowski | B26D 3/28 | 81/9.51 |
| 2005/0050713 A1 * | 3/2005 | Locher | H01R 43/05 | 29/564.4 |
| 2005/0066528 A1 * | 3/2005 | Ducret | H02G 1/1297 | 30/90.2 |
| 2008/0230267 A1 * | 9/2008 | de la Borbolla | H01R 13/73 | 174/520 |
| 2008/0257112 A1 * | 10/2008 | Stepan | G02B 6/4497 | 81/9.51 |
| 2009/0013535 A1 * | 1/2009 | Derancourt | H02G 1/1226 | 30/90.6 |
| 2009/0288267 A1 * | 11/2009 | Van Wagenen | H02G 1/1297 | 15/320 |
| 2011/0083539 A1 * | 4/2011 | Ducret | H02G 1/1224 | 83/411.6 |
| 2013/0032011 A1 * | 2/2013 | Antonischki | H02G 1/005 | 82/1.11 |
| 2016/0308338 A1 * | 10/2016 | Hanna | D07B 7/18 | |
| 2017/0012412 A1 * | 1/2017 | Symington | H02G 1/14 | |

FOREIGN PATENT DOCUMENTS

| | | |
|---|---|---|
| CN | 105390907 A | 3/2016 |
| GB | 2439604 A | 1/2008 |
| JP | H0454410 U | 5/1992 |
| JP | 2000071135 A | 3/2000 |
| JP | 2000166044 A | 6/2000 |
| JP | 3112171 B2 | 11/2000 |
| JP | 2012231629 A | 11/2012 |

OTHER PUBLICATIONS

Japanese Office Action dated Apr. 16, 2018 for Application No. 2017-108045.

Non-English Chinese Office Action dated Sep. 3, 2018 for Application No. 201710400408.1.

Non-English Chinese Office Action dated Feb. 22, 2019 for Application No. 201710400408.1.

* cited by examiner

CABLE ARMOUR STRIPPING UNIT

CROSS-REFERENCE TO RELATED APPLICATION

This application claims priority to European Application No. 16172232.7 having a filing date of May 31, 2016 the entire contents of which are hereby incorporated by reference.

FIELD OF TECHNOLOGY

The following describes a cable armour stripping unit, and a method of stripping armour from a transmission cable.

BACKGROUND

To transport electrical energy from an offshore facility, it is usual to use a transmission cable that can be laid on the seabed. Such a transmission cable generally has an inner bundle which comprises a number of conductors for multiphase power transmission, and which might also enclose a data communication line. This inner bundle is screened and contained in a jacket, which in turn is protected by a number of outer layers. Usually, several of these outer layers enclose some kind of armouring, for example a close arrangement of copper or galvanized steel wires. These can form a separate layer between sheaths and/or can be embedded in a sheath. An outermost armouring layer of the transmission cable serves to protect the inner layers from damage and corrosion, and is generally made of a resilient material such as a thermoset polymer, nylon, bitumen etc. The outermost armouring layer can also comprise embedded wires. To ensure that the complete transmission cable is to some extent flexible, and to increase the resilience of the armouring, any wires embedded in an armouring layer are generally arranged at a pitch angle to the longitudinal axis of the cable. The armouring wires therefore describe helical paths about the longitudinal cable axis. Different armouring layers of a transmission cable may have different and/or opposing pitch angles.

When installing an offshore facility such as a wind turbine or oil rig, a transmission cable is brought to the offshore facility by means of a pipelay vessel, and one end of the transmission cable is raised to the level of a transition platform or transition piece of the offshore facility. In the example of a wind turbine, electrical connections must be made between the wind turbine generator and the transmission cable in order to transport electrical power from the wind turbine to a grid. Similarly, electrical connections must be made between any control units of the wind turbine and a communication cable of the transmission cable. Before making such electrical connections, the conductors and any communication cable inside the inner jacket of the transmission cable must be exposed. To this end, the armouring layers must be completely removed over a certain length of the transmission cable.

At present, the step of removing the armouring layers is usually performed manually. A suitable cutting tool is used to make incisions into the outer layers of the transmission cable to a suitable depth. It is important not to insert the cutting tool too far into the armouring, otherwise the inner layers may sustain damage. Equally, it is important to make sufficiently deep incisions, otherwise the cutting step must be repeated, thereby increasing the risk of cutting too deeply. However, the material strength of the outer layers and the armouring can make it difficult to operate the cutting tools with the necessary degree of precision. Another problem arises from the difficulty of handling the heavy and unwieldy transmission cable in a confined space such as the transition piece of an offshore wind turbine. For these reasons, the step of manually removing armouring from transmission cables is presently a hazardous and costly procedure.

SUMMARY

An aspect relates to an improved way of removing the armouring from such a cable.

According to embodiments of the invention, the cable armour stripping unit comprises a frame realized to accommodate a transmission cable and to hold a cutter arrangement comprising at least one cutting tool arranged to cut into an armoured outer layer of the cable; a vertical feed arrangement realized to effect a translation of the frame relative to the transmission cable; and a rotation arrangement realized to effect a rotation of a cutting tool relative to the cable. In the context of embodiments of the invention, the transmission cable may be understood to have a number of armoured outer layers arranged about an inner sheath enclosing a number of conductors, as described in the introduction.

The inventive cable armour stripping unit has a number of advantages over the conventional techniques. Since the cutter arrangement is mounted on the frame, and the cable can be fed relative to the frame as well as rotated relative to the cutter arrangement, it is possible to make controlled incisions into the outer armouring layer. The speed of cutting as well as the direction of cutting can be very precisely controlled. This reduces the risk of cutting too deeply into the outer layers, which would result in costly damage to the inner jacket and possibly also to the inner cable bundle. Equally, the inventive cable armour stripping unit avoids insufficiently deep cuts and repetitions of the cutting step.

According to embodiments of the invention, the method of stripping armour from a transmission cable comprises the steps of arranging the cable within the frame of such a cable armour stripping unit; actuating a number of cutting tools of the cutter arrangement to cut into an armoured outer layer of the cable; actuating the vertical feed arrangement to effect a translation of the frame relative to the cable; and actuating the rotation arrangement to effect a rotation of the cutting tools relative to the cable.

An advantage of the method according to embodiments of the invention is that the removal of the outer armouring can be effected relatively quickly and very precisely, thus reducing the hazards associated with manual removal of the armouring.

Particularly advantageous embodiments and features of the invention are given by the dependent claims, as revealed in the following description. Features of different claim categories may be combined as appropriate to give further embodiments not described herein.

The terms "armour" and "armouring" may be considered to be synonymous and are used interchangeably below. In the following, it may be assumed that the transmission cable is a subsea transmission cable, with the usual thick outer layers or sheaths realized to protect an inner cable bundle or core. Also, without restricting embodiments of the invention in any way, it may be assumed that the transmission cable terminates at an offshore wind turbine, and will serve to transport electrical power from the wind turbine to an electrical grid or on onshore facility. The inventive cable armour stripping unit is preferably realized for use at the level of a transition piece located between an offshore support structure and a wind turbine tower mounted on the offshore support structure.

Any suitable cutting tool can be used that is capable of making an incision into an armouring layer. In a particularly preferred embodiment of the invention, a cutting tool is a circular saw, since this type of saw can be operated in a controlled manner at high speed to make incisions to a desired depth. A cold saw is preferably implemented, since this type of saw is particularly suitable for cutting through metal without generating excessive heat. In the following, without restricting embodiments of the invention in any way, it may be assumed that the cutting tool is a circular saw. Preferably, the cutter arrangement comprises two circular saw blades that can be controlled synchronously. Synchronous control of the saw blades is to be understood to mean that the cutting angles and cutting speeds of the saw blades are set to achieve a specific cutting action, as will be explained in more detail below.

The inventive cable armour stripping unit has a vertical feed arrangement which can effect a relative translation between cable and frame. The way in which the vertical feed arrangement is realized may depend on whether the frame should travel along a stationary cable, or whether the cable should be transported through a stationary frame. For example, if the frame is mounted at the level of the transition piece, the vertical feed arrangement can be realized to move the transmission cable vertically upwards and/or downwards through the frame. Alternatively, if the transmission cable is rigidly held in a cable hang-off at the level of the transition piece, the vertical feed arrangement can be realized to move the frame vertically upwards and/or downwards relative to the fixed transmission cable. In such a realization, the frame can be raised and lowered relative to the transition piece by an arrangement of push-pull winches, for example.

In either case, a rotation arrangement is preferably realized to move the cutting tools—i.e. the saw blades—about the transmission cable, since a transmission cable generally resists torsion. To this end, when the frame is mounted at the level of the transition piece, it is preferably realized to also move about the transmission cable.

Preferably, the inventive cable armour stripping unit comprises a control module realized to set various parameters such as the incision depth of a saw blade into the armoured outer layer, the attitude of a saw blade relative to the cable, etc. The control module is also preferably realized to set the rotational speed of a circular saw.

In a further preferred embodiment of the invention, a circular saw is mounted by means of a bracket to the frame. Preferably, the bracket is jointed in a suitable manner to achieve a means of tilting the circular saw blade at an angle relative to a longitudinal axis of the cable. Such a joint is preferably controllable in order to set the tilt angle of the circular saw. In a particularly preferred embodiment of the invention, the tilt angle corresponds to a pitch angle of an armoured outer layer.

To improve the precision of the cutting, the cutter arrangement preferably comprises a pressure sensor arranged to sense a pressure exerted on the saw blade as it cuts through the armouring. The pressure sensor can report pressure measurements or values to the saw control module, which can react accordingly. For example, a sudden decrease in pressure can indicate that the saw blade has penetrated through an outer armouring layer and has reached another, inner armouring layer. The saw control module can then determine the depth of the outer armouring layer and can control the saw blade(s) accordingly. Such a pressure sensor may be incorporated in a hydraulic system that is part of the power supply to a saw blade.

Two saw blades can be controlled independently to achieve various cutting patterns, depending on the type of armouring to be cut. For example, two saw blades can be diametrically opposed about the transmission cable, and tilted at the pitch angle of the outermost armouring layer. The control unit can set the cutting depth for the blades, i.e. the depth of the outermost armouring layer. The vertical feeder effects a longitudinal movement of the cable relative to the frame, and the rotation means effects a rotation of the cutting tools about the cable at a speed that is based on the pitch angle of the outermost armouring layer. In this arrangement, two circular saw blades effectively cut two helical bands of the outermost armouring.

In another example, a transmission cable may have an outermost armouring layer with a positive pitch angle and another inner armouring layer with a negative pitch angle. The outermost armouring layer may be more resilient than the inner armouring layer. To remove these layers, the saw control module of the inventive armour stripping unit tilts a first circular saw blade at an angle to match the positive pitch angle of the outermost layer, and tilts the second circular saw blade at a negative pitch angle to match the pitch angle of the inner layer. The control module can also individually control the pressure exerted by each saw on the armouring layer that it is working on, for example based on feedback from a number of pressure sensors, and can also individually control the cutting speed of each saw. In this way, several layers of armouring can be removed essentially simultaneously. Of course, it will be understood that a certain amount of an outermost armouring layer must be removed by a first saw before a second saw can commence cutting the next inner armouring layer. An armour stripping unit with three or more saw blades is also conceivable, so that three more armouring layers can be removed simultaneously. In any case, the control unit can control the saw blades and the translation/rotation means to execute any sequence of steps required to achieve a complete removal of the armouring layers to reach the depth of the inner jacket.

In a further preferred embodiment of the invention, the saw blades are controlled in a cutting sequence to cut the armoured outer layer in pieces or sections. For example, two saw blades may be positioned at the same level and at the same horizontal angle, and controlled so that a first saw blade cuts to half the desired depth, and the second saw blade completes the incision to the desired total depth. Of course, this type of cutting sequence could be achieved by three or more saw blades. After completing a horizontal cut, the saw blades can be set up to make vertical (or slanted) cuts, so that the armouring is cut into polygonal pieces.

Even after the saw blades have cut into the armouring, the rigidity and thickness of the armouring means that it will generally remain in place about the inner jacket. Therefore, in a particularly preferred embodiment of the invention, the cable stripping unit comprises an armour pry tool realized to pry a cut armour layer from the cable. Such a tool can comprise a flat blade or lever that can be pushed between an outer cut layer and an inner layer in order to prise away the cut layer. For example, if an outer armouring layer is being cut to give a helical band, the pry tool can simultaneously prise the cut band away from the inner jacket as the cable is moved relative to the frame.

To ensure that the removed armouring does not escape and fall onto the cutting tools, the pieces of armour are preferably collected so that they can be correctly disposed of. To this end, the inventive cable stripping unit preferably comprises a collector unit realized to collect the pieces of cut armour. For example, the pry tool can be set up to guide the cut bands to a collector unit, which may comprise a claw or grabber to grasp the cut pieces and remove them from the working area. Alternatively, a collector may be a net arrangement set up underneath the level of the pry tool(s) to catch the armouring pieces as they fall.

BRIEF DESCRIPTION

Some of the embodiments will be described in detail, with reference to the following figures, wherein like designations denote like members, wherein.

DETAILED DESCRIPTION

In the diagrams, like numbers refer to like objects throughout. Objects in the diagrams are not necessarily drawn to scale.

Figure 1:
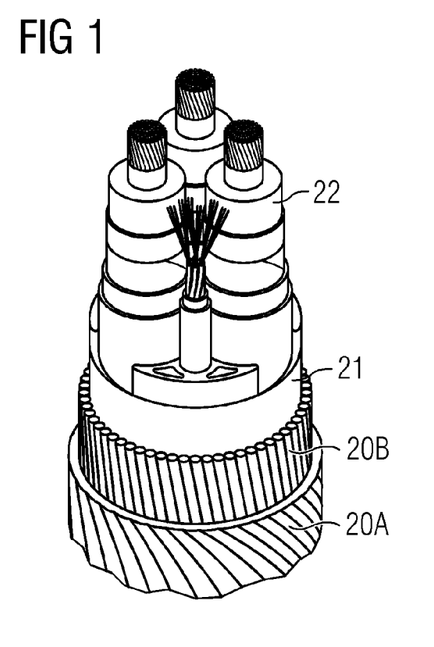
FIG. 1 shows a transmission cable of the type used to transport electrical power from an offshore wind power facility, in accordance with embodiments of the present invention.

FIG. 1 shows a transmission cable 2 of the type used to transport electrical power from an offshore wind power facility. The transmission cable 2 comprises a number of conductors 22 arranged in a bundle contained within an inner jacket 21. This in turn is enclosed by a number of protective outer layers 20A, 20B. In this exemplary embodiment, the outermost armouring layer 20A comprises steel wires embedded in a nylon or bitumen mantle; and an inner armouring layer 20B comprises an arrangement of slanted metal wires. The wires in an armouring layer are generally arranged at a pitch angle θ to ensure that the transmission cable cannot be twisted. Here, the pitch angle $\theta_B$ of the inner armouring layer 20B is positive, while the pitch angle $\theta_A$ of the outer armouring layer 20A is negative. Having multiple armouring layers with opposing pitch angle directions ensures a good resistance to torsion, but makes removal of the armouring layers very time-consuming and difficult when conventional techniques are applied.

Figure 2:
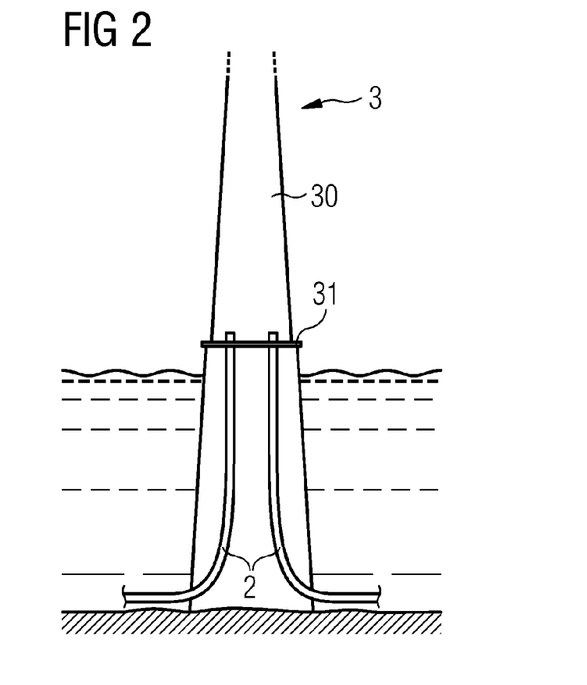
FIG. 2 shows transmission cables in place at an offshore wind power facility, in accordance with embodiments of the present invention.

FIG. 2 shows two such transmission cables 2 installed for an offshore wind turbine 3. The transmission cables 2 have been laid on the seabed in a previous pipelay procedure, and their ends have been raised to the level of a transition piece 31 of the wind turbine 3. In order to connect the conductors 22 to corresponding conductors arranged in the tower 30 of the wind turbine 3, it is necessary to first remove the armouring 20A, 20B over a desired length.

Figure 3:
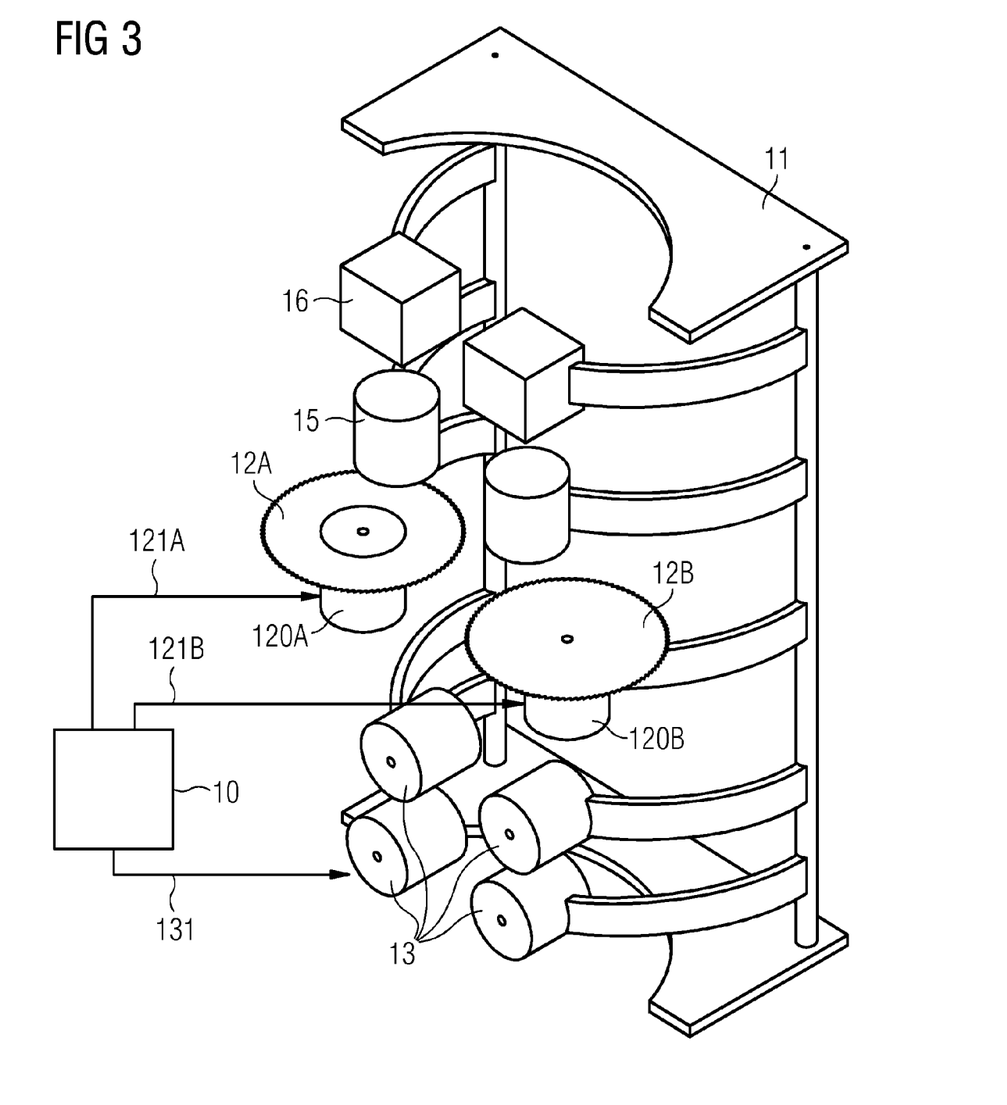
FIG. 3 shows a first embodiment of the armour stripping unit, in accordance with embodiments of the present invention.

FIG. 3 shows a first embodiment of the inventive armour stripping unit 1, which comprises a frame 11 that can be mounted to the transition piece. A cutter arrangement 12A, 12B, 10A, 120B is mounted to the frame and comprises two circular cold saws 12A, 12B. Each drive unit of a cold saw 12A, 12B is mounted by means of a jointed bracket 120A, 120B to the frame 11. A control unit 10 can control the jointed brackets 120A, 120B in order to tilt the rotational axis $R_{12}$ of a saw. To this end, the control unit 10 issues control signals 121A, 121B for the jointed brackets 120A, 120B and the saw drive units.

Figure 4:
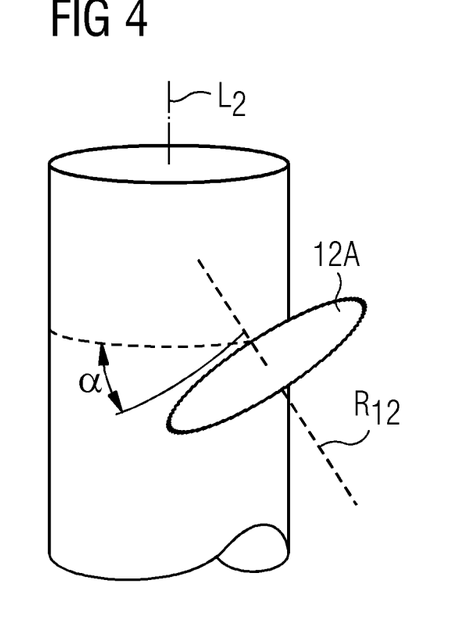
FIG. 4 is a schematic diagram showing a saw blade of the armour stripping unit of FIG. 3 tilted at a specific pitch angle relative to a transmission cable, in accordance with embodiments of the present invention.

FIG. 4 is a schematic diagram (leaving out the frame and jointed bracket) showing a saw blade 12A whose rotational axis $R_{12}$ has been tilted at an angle α relative to a plane containing a circumference $C_2$ of the transmission cable 2 (the angle α would be subtended between the circumference $C_2$ and a projection of the blade 12A onto the outer surface of the transmission cable 2). This saw axis pitch angle α may be the same as an armouring pitch angle $\theta_A$, $\theta_B$ mentioned in FIG. 1 above, and can be set by an appropriate control signal from the control unit 10.

Figure 5:
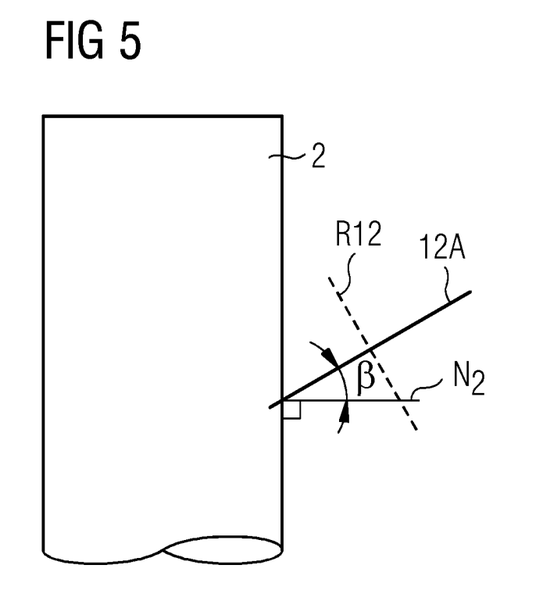
FIG. 5 is a schematic diagram showing a saw blade of the armour stripping unit of FIG. 3 tilted at a specific roll angle relative to a transmission cable, in accordance with embodiments of the present invention.

FIG. 5 is a schematic diagram showing a saw blade 12A whose rotational axis $R_{12}$ (and therefore the plane of the saw blade 12A) has been tilted relative to a normal $N_2$ extending outward from the transmission cable surface. The resulting saw plane roll angle β ensures that the saw enters the armouring at the desired angle, and can be set by an appropriate control signal from the control unit 10.

The attitude angles α, β of a saw may be chosen according to the pitch angle of the armouring which that saw is to cut and/or according to the material resilience of the armouring. During a cutting operation, the saw blade can therefore be held in an optimal orientation to cut the armouring 20A, 20B along a direction that offers the least resistance.

Returning to FIG. 3, the frame 11 also carries a pry tool 15 which comprise the cut armouring from the cable 2. A collector 16, also mounted to the frame 11, can catch any pieces of cut armouring to avoid any waste from falling to the seabed. The diagram also indicates a number of rollers/grippers arranged to vertically raise and/or lower the transmission cable relative to the frame 11. The speed of rotation of the rollers 13 can be controlled by appropriate control signals 131 issued by the control unit 10. A pressure sensor (not shown) provides feedback about the pressure exerted on a saw blade 12A, 12B during a cutting procedure, and the control unit 10 can adjust the operating parameters accordingly. The rate of vertical displacement can be controlled according to the cutting angle and cutting speed.

In this exemplary embodiment, a rotation unit 14 is arranged to rotate the frame 11 about the transmission cable 2.

Figure 6:
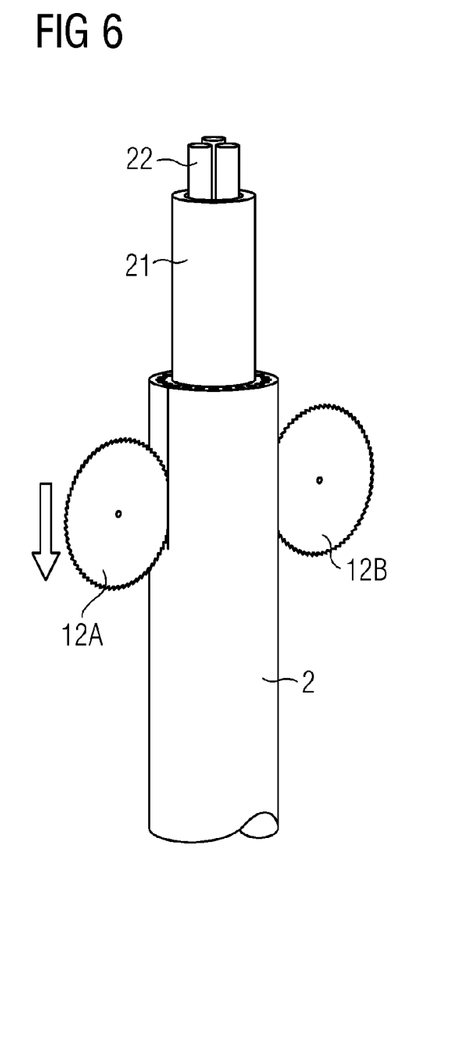
FIG. 6 shows a step of a first embodiment of a method to remove armouring from a transmission cable, in accordance with embodiments of the present invention.
Figure 7:
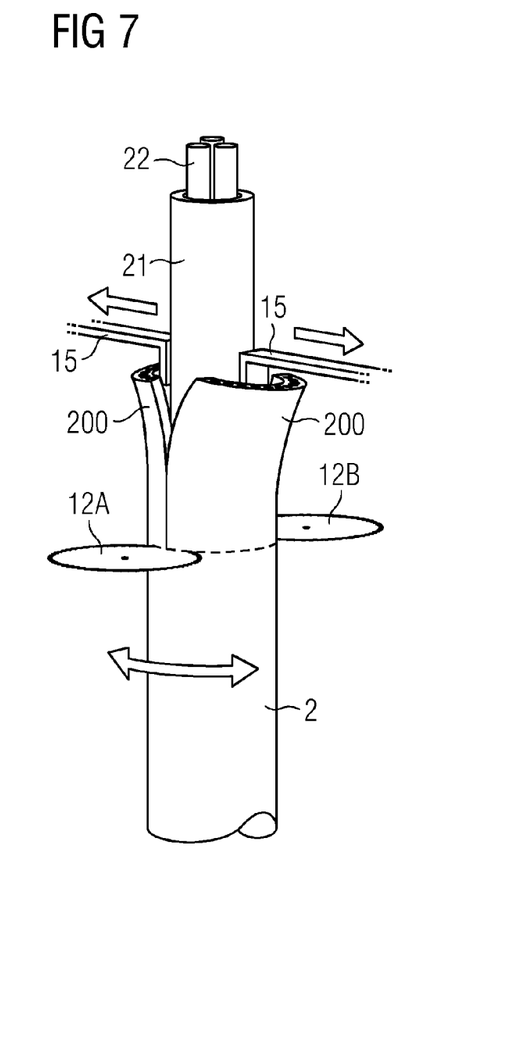
FIG. 7 shows a step of a first embodiment of a method to remove armouring from a transmission cable, in accordance with embodiments of the present invention.
Figure 8:
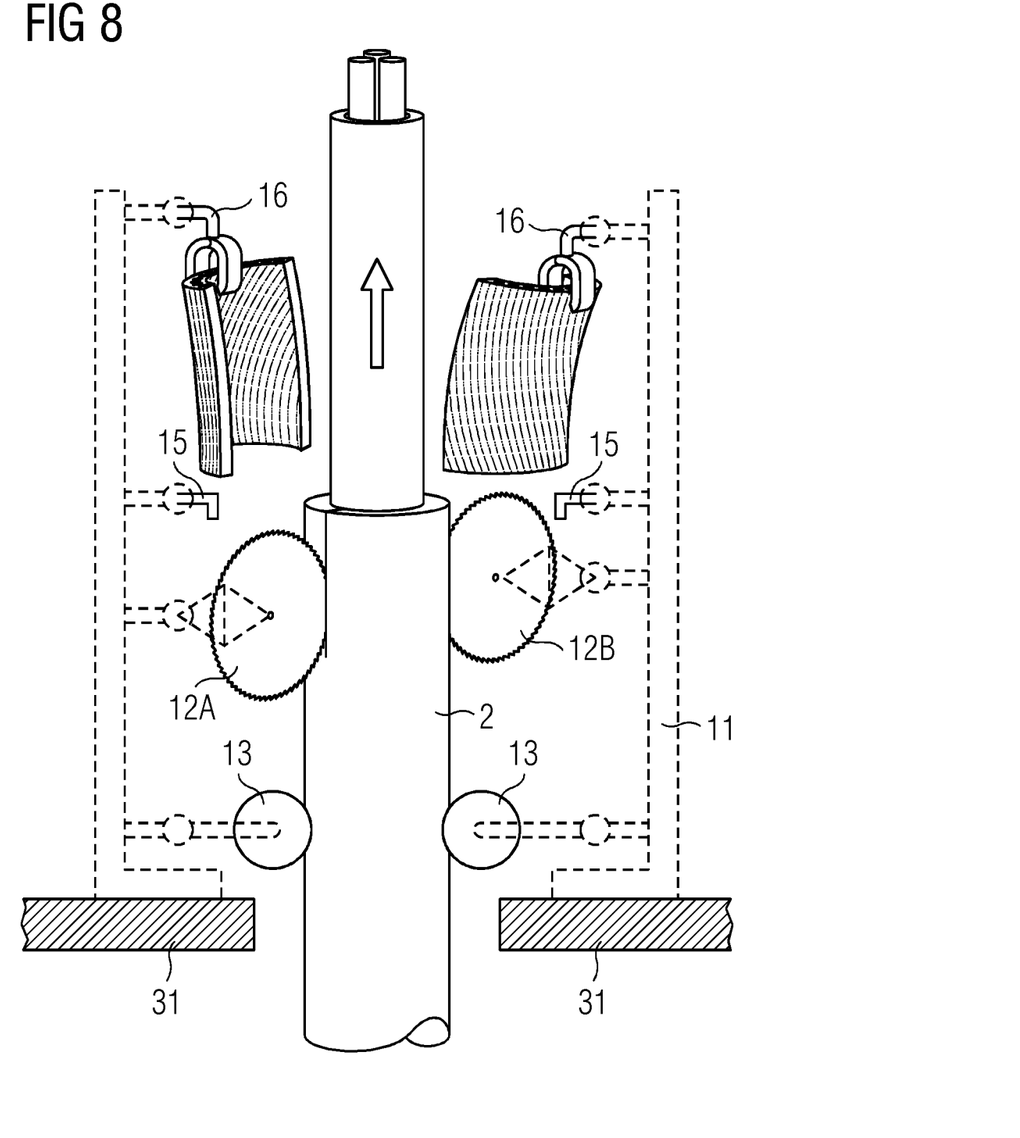
FIG. 8 shows a step of a first embodiment of a method to remove armouring from a transmission cable, in accordance with embodiments of the present invention.

FIGS. 6-8 show steps of the method according to embodiments of the invention when the armour stripping unit 1 of FIG. 3 is used to remove the armouring from a transmission cable 2. In this exemplary embodiment, the frame 11 is mounted to a transition piece 31 of a wind turbine (indicated in a simplified manner in FIG. 8). The control unit has been fed with the necessary information regarding the transmission cable 2, i.e. number of armouring layers, thickness of each armouring layer, material resilience of each armouring layer, etc. An operator can decide on the best approach to removing the armouring—e.g. whether the saws 12A, 12B should cut the armouring into helical bands, whether they should cut it into polygonal pieces, etc. In this example, one or both of the saws 12A, 12B can be held vertically and moved downwards (as indicated by the arrow) to make a vertical cut through the armouring (FIG. 6). This downward movement of the saw blades 12A, 12B can be effected by the jointed bracket and suitable control signals. The saw blades 12A, 12B are then held essentially horizontally and moved about the cable 2 (as indicated by the horizontal arrow) to make a circumferential cut through the armouring layer(s) to the necessary depth (FIG. 7). The desired depth might be achieved with a single cut, or a series of cuts may be made to reach the desired depth, depending on the number of armouring layers that need to be removed. Here also, the yawing motion of the saw blades 12A, 12B can be effected by the jointed bracket and suitable control signals, or the frame itself may rotate about the transmission cable 2. For the horizontal cuts, one or both of the saw blades 12A, 12B may be tilted at a certain roll angle β as described above to make an angled circumferential cut. At the same time, the pry tool 15 prises the armouring pieces 200 away from the exposed inner jacket 21. The vertical feeder 13 then pushes the transmission cable 2 upwards, while the saw blades 12A, 12B are held essentially vertically again to make another downward vertical cut as the cable moves upwards. The collector 16 collects the pieces 200 for disposal. The vertical feeder 13 stops moving the transmission cable 2, and the saw blades 12A, 12B are held essentially horizontally again to make another circumferential cut through the armouring layer(s). This sequence of steps is repeated until a sufficient length of the inner jacket 21 has been exposed.

Figure 9:
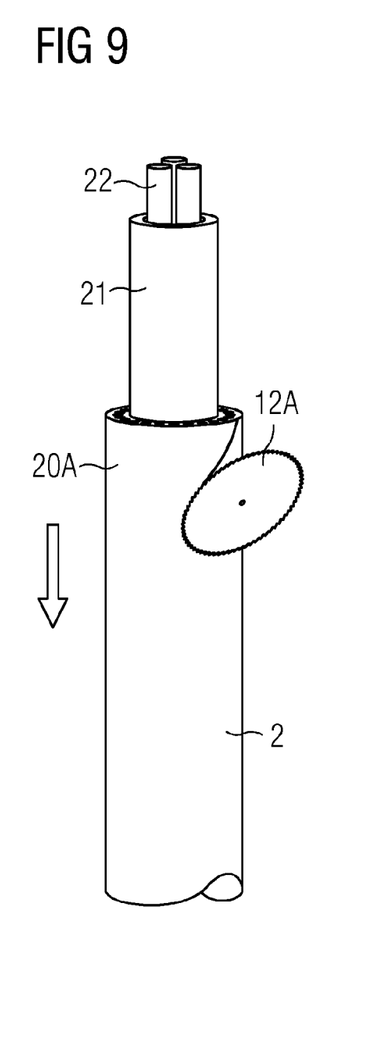
FIG. 9 shows a step of a second embodiment of the inventive method to remove armouring from a transmission cable, in accordance with embodiments of the present invention.
Figure 10:
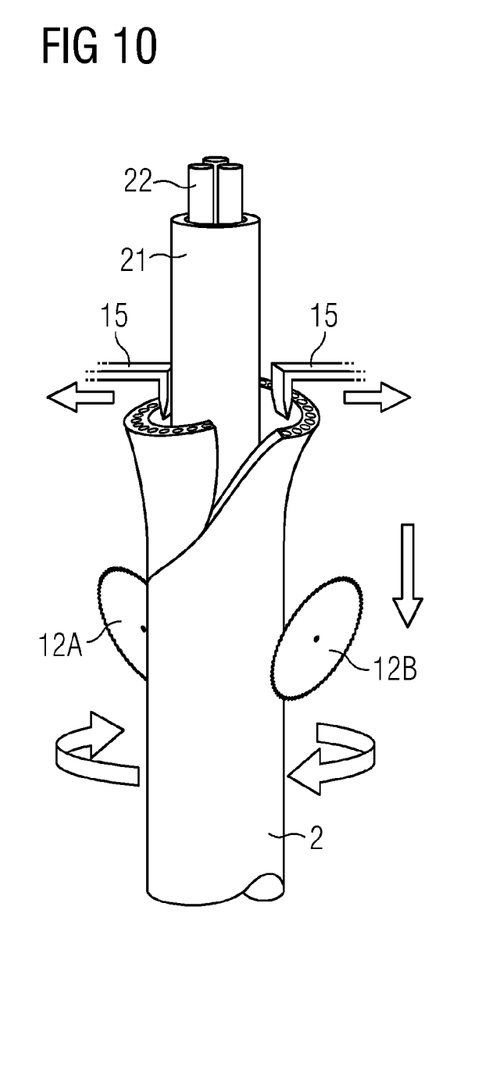
FIG. 10 shows a step of a second embodiment of the inventive method to remove armouring from a transmission cable, in accordance with embodiments of the present invention.

FIG. 9 and FIG. 10 show steps of the inventive method, using a different cutting approach. Here, the position of the transmission cable 2 is fixed relative to the transition piece 31 of an offshore wind turbine, for example by a cable hang-off (not shown). The frame 11 can move vertically relative to the transition piece 31 and the transmission cable 2. Here also, a control unit has been fed with the necessary information regarding the transmission cable 2. In this example, the saw blades 12A, 12B are held at a specific pitch angle to match the pitch angle of the armouring 20A. The frame with all its tools rotates about the transmission cable 2 and simultaneously moves downwards as indicated by the arrows in the diagrams. As a result, the saw blades 12A, 12B cut helical bands of armouring. The pry tools 15 prise the armouring away from the exposed inner jacket 21. The saw blades 12A, 12B can be re-positioned, for example by tilting each through 90°, to sever the helical strips into manageable pieces. The collector unit 16 collects the armouring pieces for disposal. This sequence of steps is repeated until a sufficient length of the inner jacket 21 has been exposed.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A cable armour stripping unit comprising:
a frame configured to accommodate a transmission cable having a plurality of armoured outer layers arranged about an inner jacket enclosing a plurality of conductors and to hold a cutter arrangement comprising at least one cutting tool arranged to cut into an armoured outer layer of the plurality of armoured outer layers of the transmission cable;
a vertical feed arrangement connected to the frame, the vertical feed arrangement configured to engage the transmission cable to vertically move the transmission cable with respect to the frame; and
wherein the at least one cutting tool is controlled to cut into the armoured outer layer.

2. The cable armour stripping unit according to claim 1, comprising a control unit for controlling a jointed bracket attaching the at least one cutting tool to the frame position the at least one cutting tool at a pitch angle relative to the transmission cable and/or to position the at least one cutting tool at a roll angle relative to the transmission cable.

3. The cable armour stripping unit according to claim 2, wherein a cutting tool pitch angle corresponds to a pitch angle of the armoured outer layer.

4. The cable armour stripping unit according to claim 1, wherein the at least one cutting tool comprises a circular cold saw.

5. The cable armour stripping unit according to claim 1, comprising a pry tool configured to pry a cut armour layer from the transmission cable.

6. The cable armour stripping unit according to claim 1, comprising a collector unit configured to collect pieces of cut armour.

7. The cable armour stripping unit according to claim 1, wherein the vertical feed arrangement and/or a pry tool and/or a collector unit are mounted on the frame.

8. The cable armour stripping unit according to claim 1, wherein the frame is attached to a transition piece located between an offshore support structure and a wind turbine mounted on the offshore support structure.

9. A method of stripping armour from a transmission cable having a plurality of armoured outer layers arranged about an inner jacket enclosing a plurality of conductors, the method comprising:
arranging the transmission cable within the frame of the cable armour stripping unit according to claim 1;
actuating a plurality of cutting tools to cut into an armoured outer layer of the plurality of armoured outer layers of the transmission cable;
actuating the vertical feed arrangement to vertically move the transmission cable with respect to the frame; and
controlling a jointed bracket attaching the least one cutting tool of the plurality of cutting tools to the frame to tilt a rotation axis of the at least one cutting tool relative to the transmission cable.

10. The method according to claim 9, wherein the actuating the vertical feed arrangement is performed during cutting of an armoured outer layer.

11. The method according to claim 9, comprising a step of simultaneously controlling a first cutting tool of the plurality of cutting tools to cut a first armoured outer layer of the plurality of armoured outer layers and controlling a second cutting tool of the plurality of cutting tools to cut a second armoured outer layer of the plurality of armoured outer layers.

12. The method according to claim 9, wherein the plurality of cutting tools are controlled to cut the armoured outer layer in a plurality of pieces.

13. The method according to claim 9, comprising a step of collecting the plurality of pieces of the cut armoured outer layer.

* * * * *